United States Patent [19]

MacKenzie et al.

[11] 3,752,997
[45] Aug. 14, 1973

[54] TENSION DETECTOR FOR STRING-LIKE ELEMENT

[75] Inventors: Fred T. MacKenzie, Daniel W. Woodman, Jr., both of Beverly, Mass.

[73] Assignee: USM Corporation, Boston, Mass.

[22] Filed: July 23, 1971

[21] Appl. No.: 165,040

[52] U.S. Cl. .................. 250/219 S, 250/229, 28/51, 66/163
[51] Int. Cl. .......................................... D02h 13/08
[58] Field of Search .................... 250/231, 219 FR, 250/219 S, 229; 112/47, 219 R; 356/238, 159, 160; 28/51; 66/163

[56] References Cited
UNITED STATES PATENTS

| 2,389,625 | 11/1945 | Lambach et al. | 28/51 |
| 3,672,315 | 6/1972 | Rockwell, Jr. | 192/91 X |
| 3,598,999 | 8/1971 | Hofmeister | 250/231 X |
| 3,470,382 | 9/1969 | Tobey | 250/219 F |
| 1,964,874 | 7/1934 | Frankboner | 250/231 X |
| 3,219,829 | 11/1965 | Reist | 250/231 X |
| 3,515,885 | 6/1970 | Behrens | 250/231 X |

Primary Examiner—Walter Stolwein
Attorney—Richard B. Megley, William R. Evans

[57] ABSTRACT

A detector responsive to the tension of a string-like element including a member having a portion for engaging the element, the member being movable between first and second positions in response to a tensile condition of the element to cause cooperative signal generating means to produce a detector signal.

2 Claims, 4 Drawing Figures

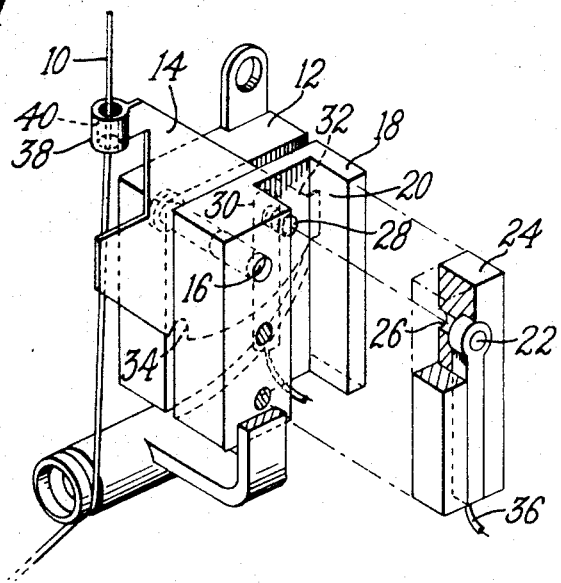
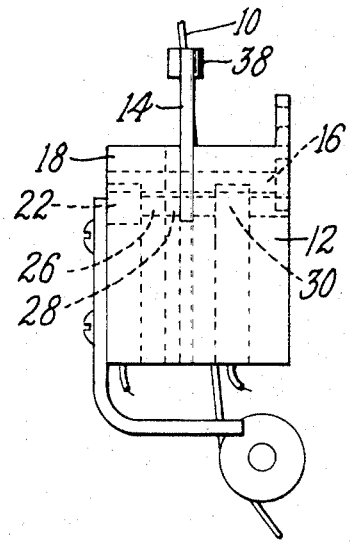
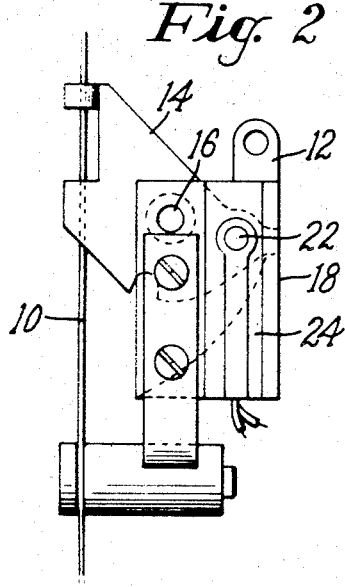
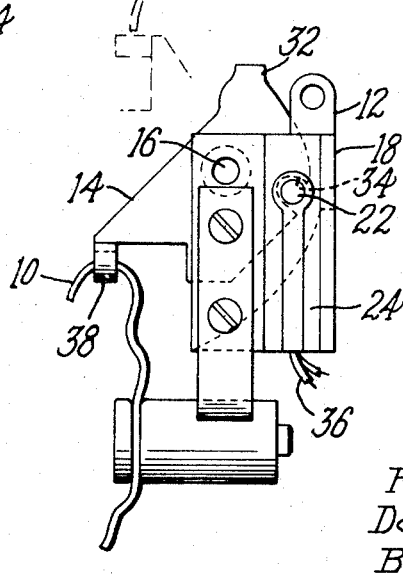
Inventors
Fred T. MacKenzie
Daniel W. Woodman Jr.
By their Attorney
William R. Evans

TENSION DETECTOR FOR STRING-LIKE ELEMENT

BACKGROUND OF THE INVENTION

This invention relates to a detector of tensile condition of string-like elements.

There are many industrial operations involving threads, yarns, strings, twines, ropes, cables, and other string-like elements. In many of these operations, the string-like element is normally in a relatively tensioned condition but may become untensioned, or vice versa. Frequently it is desirable to detect the change in tensile condition as, for example, when a change from a tensioned to an untensioned condition results from breakage of the string-like element. Breakage of the element may be detrimental to the industrial operation. For example, where the string like element is a thread in a sewing operation, thread breakage may result in blank stitches and, as a result, an imperfectly sewn article.

Frequently, an undesired change in tensile condition of a string-like element is difficult to observe. Cables are frequently mounted inside housings where changes in their tensile condition are not readily observable. Sewing and weaving threads are frequently so small as to be difficult to visually observe and, at times, are present in such pluralities as to further impair observation of individual threads. Moreover, manual observation defeats automation of industrial operations by requiring an operator to make the observations.

SUMMARY OF THE INVENTION

Accordingly, it is an object of the invention to provide a detector for producing a signal upon a change in the tensile condition of a string-like element.

To this end, the invention provides a detector having a member mounted for movement from a first to a second position in response to a change in a tensile condition of an adjacent string-like element. The member has an element engaging portion cooperative with the element to control movement of the member in response to the change in the tensile condition of the element. The member also has an indicating portion effective in at least one of the member positions to cause cooperative means to general a signal. In one preferred embodiment of the invention the signal generating means is a photoelectric device.

DESCRIPTION OF THE DRAWINGS

The above and other features of the invention will now be more particularly described in relation to an illustrative preferred embodiment of the invention and drawings thereof, in which:

FIG. 1 is a perspective, partially exploded view of a device embodying the invention and having a detector member in a first position;

FIG. 2 is a front view of the device with the member in the first position;

FIG. 3 is a side view of the device with the member in the first position; and

FIG. 4 is a front view of the device with the member in a second position.

DESCRIPTION OF THE PREFERRED EMBODIMENT

One preferred embodiment of the invention hereafter described is suitable for use on a single needle sewing machine of a type long known in the art. In such sewing machines the needle thread is usually tensioned before reaching the needle to perform the sewing operation. If the needle thread breaks or fails to become tensioned, blank or improper stiches are made by the machine with undesirable results.

To overcome this problem the preferred embodiment of the invention is shown as a thread tension detector. The detector, hereafter described, is designed to produce a signal in response to a change in the tensile condition of the thread from a tensioned to an untensioned condition such as on thread breakage. The signal from the detector may be effective to stop the sewing machine to prevent blank or improper stitches. For this purpose, the detector may be employed on a sewing machine having an automatic control for stopping a sewing machine of the type described in U.S. Pat. No. 3,080,836 issued Mar. 12, 1963 in the name of J. E. Clemens, et al.

As seen in the drawings, the thread tension detector is adapted to be mounted adjacent a tensioned portion of a needle thread 10 on a support 12 which may be attached to a convenient portion of a housing for a sewing machine (not shown). The detector has a member 14 mounted on a pivot 16 for movement from a first position shown in FIG. 2 to a second position shown in FIG. 4. The pivot 16 also serves as a stationary support for a block 18. The block has a channel 20 for locating a photoelectric signal generating device 22 mounted in a housing 24 which is received in the channel 20. Holes 26 and 28 project through the housing 24 and block 18 in alignment with the photoelectric device and a light source 30 mounted in the support 12. An integral indicating portion 32 of the member 14 interrupts the passage of light from the source 30 to the photoelectric device 22 when the member is in the first position, best seen in FIG. 2. When the member is in the second position shown in FIG. 4, a slot 34 in the member aligns with the holes 26 and 28 to permit the passage of light from the source 30 to the photoelectric device 22. The photoelectric device then generates a signal which may be transmitted to means for stopping the sewing machine (not shown) via an output lead 36. The member 14 has a thread engaging portion 38 through which the thread 10 freely passes. The engaging portion may have a bearing jewel 40 to provide a smooth, wear resistant bearing surface for guiding the thread through the bearing at high speed. The member 14 is so shaped as to have a center of gravity which provides a gravitational moment of rotation to bias the member for movement from the first position toward the second position. Engagement of the thread 10 with the thread engaging portion 38 of the member restrains the member from the biased movement when the thread is in a tensioned condition.

When the thread breaks or otherwise ceases to be tensioned, the thread provides no support to restrain the member from the biased movement. The member then moves toward the second position where it stops when the center of gravity of the cam is vertically aligned with the pivot 16. In the second position, the slot 34 aligns with the holes 26 ad 28 to permit light transmission from the source 30 to the photoelectric device 22. The photoelectric device then generates an electrical signal and transmits it from the output lead 36 to the stopping means of the sewing machine.

Restoration of thread tension is effective to return the member 14 to the first position shown in FIGS. 1 and 2. No signal is then produced at the output lead 36 and the sewing machine is permitted to operate as required.

The preferred embodiment of the invention described above illustrates only one embodiment of the invention and substitution of equivalent devices or mechanisms other than those described may be made without departing from the scope of the invention.

Having thus described our invention what we claim as new and desire to secure by Letters Patent of the United States is:

1. In a sewing machine for forming stiches with a string-like element and having means for terminating its operation in response to an electrical signal, a tension detector comprising: a support; a member mounted on the support for gravity biased movement from a first to a second position, without stop members, said member having an integral indicating portion having an opening permitting the passage of light and an integral portion for engaging the string-like element controlling the movement of the member in response to a lowered tensile condition of the element; a block mounted on the support with the indicating portion of the member normally between the support and the block, the block having a channel for slidingly receiving a photoelectric device from a separate to an operative position aligned with a hole extending from the photoelectric device through the block toward the support; and a light source mounted on the support in alignment with the photoelectric device and hole in the block for cooperation with the photoelectric device to provide an electrical signal only when the lowered tensile condition of the element permits movement of the member to the second position in which the opening is aligned with the light source and the photoelectric device.

2. A tension detector as in claim 1 wherein the member portion for engaging the element has a bearing jewel through which the element passes.

* * * * *